(12) United States Patent
Charnley, Jr.

(10) Patent No.: US 7,702,556 B2
(45) Date of Patent: Apr. 20, 2010

(54) PROCESS FOR THE SELECTION AND EVALUATION OF INVESTMENT PORTFOLIO ASSET ALLOCATION STRATEGIES

(75) Inventor: James Allen Charnley, Jr., Barrington, RI (US)

(73) Assignee: Water Street Advisers, Inc., Boston, MA (US)

( * ) Notice: Subject to any disclaimer, the term of this patent is extended or adjusted under 35 U.S.C. 154(b) by 1754 days.

(21) Appl. No.: 10/604,699

(22) Filed: Aug. 11, 2003

(65) Prior Publication Data

US 2004/0111349 A1 Jun. 10, 2004

Related U.S. Application Data

(60) Provisional application No. 60/403,234, filed on Aug. 14, 2002.

(51) Int. Cl.
*G06Q 40/00* (2006.01)
(52) U.S. Cl. .......................... 705/36 R; 705/35; 705/37
(58) Field of Classification Search ............... 705/36 R, 705/35, 37
See application file for complete search history.

(56) References Cited

U.S. PATENT DOCUMENTS

| | | | | |
|---|---|---|---|---|
| 5,619,695 | A * | 4/1997 | Arbabi et al. | 718/100 |
| 5,812,987 | A * | 9/1998 | Luskin et al. | 705/36 R |
| 6,003,018 | A | 12/1999 | Michaud et al. | 705/36 |
| 6,021,397 | A | 2/2000 | Jones et al. | 705/36 |
| 6,078,904 | A | 6/2000 | Rebane | 705/36 |
| 6,125,355 | A | 9/2000 | Bekaert et al. | 705/36 |
| 6,907,403 | B1 * | 6/2005 | Klein et al. | 705/36 R |
| 6,912,509 | B1 * | 6/2005 | Lear | 705/36 R |
| 2002/0007329 | A1 * | 1/2002 | Alcaly et al. | 705/35 |
| 2002/0147672 | A1 * | 10/2002 | Gaini | 705/36 |
| 2003/0120568 | A1 * | 6/2003 | Chacko et al. | 705/35 |
| 2003/0126054 | A1 * | 7/2003 | Purcell, Jr. | 705/36 |

OTHER PUBLICATIONS

George Dantzig, Linear Programing, Operations Research, Jan.-Feb. 2002, vol. 50, Iss. 1; p. 42, 7 pgs.*
Robert E Taylor, a practical approach to computerizing optimization problems, Industrial Management, Jul.-Aug. 1997, vol. 39, Iss. 4; p. 20, 4 pgs.*
Wall, Larry D, Reichert, Alan K, Mohanty, Sunil, Deregulation and the opportunities for commercial bank diversification, Economic Review — Federal Reserve Bank of Atlanta, Sep.-Oct. 1993, vol. 78, Iss. 5; p. 1, 25 pgs.*

* cited by examiner

*Primary Examiner*—Hani Kazimi
*Assistant Examiner*—Hao Fu
(74) *Attorney, Agent, or Firm*—Barlow, Josephs & Holmes, Ltd.

(57) ABSTRACT

The method for selecting and evaluating investment portfolio asset allocation strategies includes the step of constructing a record of investment performance statistics for a population of all possible asset allocation alternatives. A series of the average of the periodic returns for the population of securities within each of a number of market sectors is generated. Each allocation alternative is determined from the unique combination of multiples of the minimum allocation percentage increments for each of the market sectors. A list of the population of all possible allocation alternatives is then compiled from the population of all combinations of multiples of minimum allocation percentage increment for each market sector. The series of weighted-average periodic investment returns for each of the allocation alternatives is then calculated. The record of performance statistics is completed by calculating population-comparison statistics for a plurality analysis-periods.

14 Claims, 7 Drawing Sheets

PERIODIC RETURNS

A {
| SECTORS | 1 | 2 | 3 | 4 | 5 |
|---|---|---|---|---|---|
| AGG | (1.63) | (25.99) | 3.69 | 9.29 | 4.91 |
| AAB | (0.90) | (18.80) | 2.82 | 9.80 | 5.98 |
| AVG | 0.58 | (9.80) | 1.85 | 6.73 | 4.93 |
| LRSK | 0.68 | 0.68 | 0.71 | 0.70 | 0.73 |
| CON | (0.66) | (18.70) | 0.24 | 7.47 | 7.04 |

B {
| | ALLOCATION ALTERNATIVES | | | | | PERIODIC RETURNS | | | | | } C |
|---|---|---|---|---|---|---|---|---|---|---|---|
| | AGG | AAB | AVG | LRSK | CON | 1 | 2 | 3 | 4 | 5 | |
| 1 | 100% | 0% | 0% | 0% | 0% | (1.63) | (25.99) | 3.69 | 9.29 | 4.91 | |
| 2 | 95% | 5% | 0% | 0% | 0% | (1.59) | (25.63) | 3.65 | 9.32 | 4.97 | |
| 3 | 95% | 0% | 5% | 0% | 0% | (1.52) | (25.18) | 3.60 | 9.16 | 4.92 | |
| 4 | 95% | 0% | 0% | 5% | 0% | (1.51) | (24.65) | 3.55 | 8.86 | 4.71 | |
| 5 | 95% | 0% | 0% | 0% | 5% | (1.58) | (25.62) | 3.52 | 9.20 | 5.02 | |
| 6 | 90% | 10% | 0% | 0% | 0% | (1.55) | (25.27) | 3.61 | 9.34 | 5.02 | |
| ↓ | | | | | | | | | | | |
| 10,626 | 0% | 0% | 0% | 0% | 100% | (0.66) | (18.70) | 0.24 | 7.47 | 7.04 | |

PROCESS FOR THE SELECTION AND EVALUATION OF INVESTMENT PORTFOLIO ASSET ALLOCATION STRATEGIES

CROSS REFERENCE TO RELATED APPLICATIONS

This application claims the benefit of U.S. Provisional Application Ser. No. 60/403,234, filed Aug. 14, 2002.

BACKGROUND OF INVENTION

This invention is a process for the selection and evaluation of investment portfolio asset allocation strategies based on the quantitative analysis of past investment performance. This process relates to the collection and analysis of comparative statistics for whole populations of allocation alternatives over a series of time-periods.

The present invention relates to the replacement of existing quantitative processes of selection and evaluation that rely on algorithmic methods to generate a solution set of allocation strategies based either on the analysis of small, highly volatile groups within a population of allocation-alternatives or on projections of future economic conditions and their effect on asset class performance.

In contrast to these algorithmic approaches, the process of the present invention relates to a data-base approach that works from the analysis of series of statistics of population dynamics over time. This procedure is a much more labor and computer-intensive procedure than those based on algorithmic solutions. This is a part of the reason why it has not been developed before. Its legitimacy, however, can be validated by virtue of its ability to call into question the utility of several popular industry practices regarding strategy selection that have been developed from these algorithmic processes.

The process of the present invention relates more specifically for use by a "conservative investor" otherwise known as an investor who has become skeptical of the value of investment advice based on the ability to predict the future. These conservative investors are, by definition, the users of advice regarding asset allocation strategies. Its business use is predicated on the belief that such investors value stability and place highest priority on allocation strategies whose investment performance remains most stable over changes in market conditions.

These investors are ill-served by solution sets derived from known prior art algorithmic processes, because these processes fail to account for the effect of changes in market conditions. Changes in market conditions occur with such regularity and frequency as to be commonly known as "market cycles". Therefore, there is a need for a process that can compare whole populations of alternatives across multiple market-cycle phases. It is characteristic of investors to hold their investment assets as portfolios and to allocate the assets of those portfolios among investment alternatives of diverse risk in order to mitigate the effects of these market cycles on portfolio investment performance. Therefore, a process is desired that is uniquely relevant to the uses of an investor that holds their investable assets as a portfolio and employs asset allocation as a part of their investment strategy.

It is well known that investors, unless they possess perfect foresight regarding the future path of investment markets and of the performance of individual investments, will seek to hold more than one investment at a point in time, in order to hedge against future investment-performance volatility arising from a less-than-perfect selection. Holding more than one investment creates an "investment portfolio". Such a hedging process is commonly referred to as "asset diversification", and the formulation of a plan for asset diversification is commonly referred to as "selecting an asset allocation strategy". Selecting a strategy, to the extent that it is based on a quantified analysis of alternatives, will entail either the comparison of alternatives in terms of the characteristics of their past investment performance or the projection of future investment performance based on a forecast of future market conditions and their predicted effect on the performance of the investments within a portfolio.

Selecting an asset allocation strategy is one of three basic functions necessary for selecting and maintaining an investment portfolio. An asset allocation strategy is set out in terms of percentages of portfolio assets to be held in investments from each market sector. The $40 trillion global market for publicly traded securities can be segmented into a small handful of "market sectors" which are groups of securities who, over time, have demonstrated a similar pattern of investment risk that has been uniquely different from securities in other sectors. These groups of securities are commonly known as "asset classes". Once this allocation strategy has been formulated, the other two management functions are to 1) select for investments within each sector that together will provide a diversified risk; 2) select for investments whose future investment performance will be strong relative to their sector peers.

In 1952, Dr. Harry Markowitz published a thesis entitled, Modern Portfolio Theory (MPT), in which he proved, by use of an algorithm, that the value of such asset diversification efforts would be maximized by combining investment assets from market sectors whose patterns and levels of investment risk had been uniquely different over time. The results of this algorithm are to define a sub-population of allocation strategy alternatives, known as an "efficient frontier", and a line, known as the "efficiency-line", that identify those asset allocation strategies that generated the maximum investment return across a range of investment risk available within a population of allocation-strategy alternatives in a prior time-period.

Dr. Markowitz also created two other definitions that have become central to the practice of investment management and are germane to this patent application. He defined the concept of "investment performance" as the product of two variables which is investment returns and investment risk where that relationship is plotted as a two-dimension graph with the y-axis marking investment return as the average of a series of contiguous periodic returns and the x-axis marking investment risk as the variance of those periodic returns around their average. This is known as a "mean-variance" graph. He also defined the objective of the investor as maximizing the investment returns available for a level of investment risk. His "efficient-frontier" is the solution-set of allocation alternatives that satisfy this objective.

FIGS. 1 and 2 illustrate Dr. Markowitz" known prior art concepts of investment performance, mean-variance graph and an efficient frontier for a population of allocation alternatives. To the extent that processes involving the quantitative analysis of past-period investment performance statistics are used for selecting or evaluating asset allocation strategies, the investment management industry has exclusively adopted processes based on Dr. Markowitz" algorithm and the identification of the population of allocation alternatives residing on this frontier at a given point in time.

The usefulness of the allocation alternatives whose investment performance is identified as resident upon an efficiency-line in a past period is conditioned by assumptions regarding the stability of that residency in future periods. As will be described and illustrated in detail below, these assumptions made by prior art methods are flawed.

For those investors who have likewise become skeptical of the utility of the efficiency-line processes, there currently exists a more proactive algorithmic approach designed to forecast future market trends and anticipate their effects on asset-class performance. This approach relies on two algorithmic processes. The first "decomposes" the past investment performance of available investments into a weighted sum of two or more "market factors". These market factors are commonly market indices, such as the S&P500 Market Index. The attribution of market-index performance statistics to the performance of an individual investment is an algorithmic process called "factor analysis". A "pricing kernel", a second algorithm, projects the future path of markets and their effect on the investment performance of these market indices.

There exist investors that are also skeptical of the utility of this process, based on the general track record of economists and other analysts in forecasting future economic and market conditions, and the recent troubles of Long Term Capital Corp. and other commercial ventures in applying this technology to the selection of investments and allocation strategies. For these investors, another option is needed for selecting a strategy to allocate the assets of their investment portfolios that overcomes the shortcomings found in prior art methods.

In the investment field, there are problems involved with the acceptance by investors of the "pricing-kernel" algorithmic process. Beyond its poor record in commercial application, there exists the illogical nature of applying it to a process of asset diversification. In the first instance, if the provider of such a process could indeed predict the future path of markets and investment performance, there would exist no need to diversify because the investment recommendation could be limited to a single optimal investment. Secondly, if a provider could in fact predict the future, he would, for obvious reasons, forego sharing this information with others.

These processes, in fact, cannot generate a specific recommendation, but are cast as a "stochastic solution" which is a probability array of future choices. The value of these probability arrays depends on the assumption that the probable path of future market cycles follows a normal, or at least, a symmetrical distribution. It has been shown in the past that the actual path of market cycles often deviates from this assumption, and as the troubles of Long Term Capital Corp have aptly demonstrated results in loss of funds.

There have been many attempts in the prior art to solve the aforementioned problems. There exist several patents for processes to select allocation strategies based on these predictive algorithms.

This process for analyzing comparative investment performance statistics among a population of allocation alternatives is not unlike the analyses that have historically been generated in regard to comparing investments within an asset class, which is the population of investments within a market sector. Averages for investment return and risk are commonly computed from population data for a specified analysis-period, and the performance of individuals within each population is compared to these averages. A series of analysis-period analyses are then compared by calculating an average and variance for statistics that they hold in common and the time-period trends so identified are tested for statistical relevance.

However, the prior art have not applied these processes to populations of allocation alternatives. The prior art is devoid of such methodologies. Prior methods for describing allocation alternative populations that have taken as their basis the MPT efficiency-line algorithm and processes derived from this algorithm cannot analyze performance differences among populations of allocation alternatives because they cannot see those populations of alternatives or track them over time.

Due to lack of computing power in the past, the use of the MPT algorithm was desirable because it used little computing-resources, as long as one keeps small the number of market-sectors under consideration. The algorithm involves terms for the pair-wise covariant relationship between market-sectors, namely five market sectors involves calculating ten pair-wise covariant terms; ten market sectors involve calculating forty-five covariant terms.

Defining an allocation-alternative population by means of a data base of computed investment return and risk for each allocation alternative is much more computer and labor-intensive. The population of allocation alternatives arising from five market sectors combined in 5-percent increments is 10,626; for ten market sectors, the population of alternatives is 7.75 million.

There is a desire for a method to work on commercially available spreadsheet and database software, such as Microsoft Excel and Access and a PC of that is configured for the maximum available memory, storage and computing speed. At a five marketsector population, the capacity of the software and current PC computer hardware is taxed, requiring multiple sub-steps to accumulating the performance statistics for a 10,626-item population. Without careful adherence to these sub-steps, the scope of the calculations is beyond the capacity of the machinery. However, present day consumer computers are can perform the desired calculations. Thus, modern computing technology has enabled large number processing possible at low cost.

Processes related to investment management have been granted patents only over the last few years. Until recently, the existence of innovations and existing practices in the field has been communicated primarily through publication in academic journals and textbooks on financial economics. A review of prior art must include these sources as well as the patent record.

Modern Portfolio Theory and Investment Analysis, by E. Elton and M. Gruber, 1995, teaches two methods for asset allocation selection. Both begin with the calculation of an "efficient frontier" in the manner as outlined previously in this paper. For a portfolio comprised of only "risky-assets", it recommends selecting allocation alternatives that reside on the efficiency-line made from market sectors containing those risky assets and at a level of returns variance commensurate with the investor"s risk tolerance. For a portfolio comprise of both risky and riskless assets, it recommends finding the most efficient of the allocation alternatives made from the risky assets, known as the "market portfolio", and then amending that allocation strategy with the addition of riskless assets to achieve a level of returns variance commensurate with the investor"s risk tolerance. The expected performance from such an amended strategy can be located on a mean-variance graph as a straight line drawn from the point of average return for the riskless asset through the point of return for the market portfolio, the line being known as a "market line", FIG. 2. The Elton and Gruber exposition of the population of allocation alternative available to an investor never references the remainder of the allocation population that resides off the efficiency line.

The methodology of selecting for an allocation alternative from an efficiency line or market portfolio population is one that works much better in theory than in practice. As my process can demonstrate, the future investment performance for an allocation-alternative selected from an efficiency line for a series of selection periods over the last forty years has been poor relative to its allocation population peers. Picking a single point from among an efficiency-line population compounds the problem, generating a selection of even a poorer record of relative future performance and further compromising a process whose purpose is to ensure that the future strength and stability of an investment portfolio"s performance will meet investor expectations.

The prior art also includes articles within the research journals over the last fifty years that explore allocation strategy selection. Many of these articles advocate for adding one or more explanatory variables to the prior-period measurements of investment return and risk that go into creating the efficient-frontier population, in effect changing the two-dimensional efficiency line into a three dimensional cone. The jury is still out over whether adding additional factors to an efficiency-line creates a solution to the future performance problems arising from such selections. However, the important point is that in all of its machinations, the prior art never once references the allocation alternatives that may lie inside this line or cone.

A number of prior art patents exist for processes related the function of asset allocation strategy selection and evaluation. Some related to predictive algorithms, a pricing kernel or otherwise "hidden algorithm" being an integral part of their process. Other prior art methods employ processes other than strategy selection and evaluation, and default to "external factors" for the identification of an allocation strategy. Additionally, other prior art methods use a process built off the procedure of finding an efficiency-line population of allocation alternatives.

As example of predictive algorithms, U.S. Pat. No. 6,021,397 issued to Jones, et al. and U.S. Pat. No. 6,125,355 issued to Bekaert, et al. decompose the past performance of investment alternatives into a set of factors made from market indices and then predict the future path of investment markets and their effect on the performance of these factors using a pricing kernel of unspecified dimensions. As example of selection and evaluation processes built from an efficiency-line populations, U.S. Pat. No. 6,078,904, issued to Rebane, identifies a single point of maximum differential returns from among a set of allocation strategies that reside on an efficiency line. Also, U.S. Pat. No. 6,003,018, issued to Michuad et al., employs a process that evaluates the continuing suitability of allocation alternatives selected by an efficiency-line by a "resampling procedure" which runs a number of economic simulations to create a probability distribution around each point on the line.

In view of the prior art, the primary need is to correct for erroneous and misleading information generated by existing algorithmic processes using an efficiency line. These processes are the ones most generally in use within the market, and their shortcomings the most damaging to the interests of investors.

Prior art algorithmic processes, which are based on the analysis of an efficiency-line population, are deficient at two levels. First, the Markowitz algorithm used in such analyses identifies only a small portion of the allocation alternatives available. If an investor decides for an allocation alternative that does not appear on this "efficiency line" for a prior-period, the question arises as to how to identify its relative value.

For example, of the total population of allocation alternatives that can be constructed from a population of market sectors, less than 1% of those alternatives will reside on the efficiency line for any given time period. For the analysis of the investment performance for the other 99% of a population of allocation alternatives, the data generated by an algorithm defining an efficiency line will fail to assist the investor.

The second, and more critical issue is that the alternatives identified through their residency upon an efficiency line in a prior-period are those least likely to be relevant to the purposes of an investor. The investor"s objective of maximizing returns for a level of risk implies that an allocation-alternative"s position of an efficiency line in a prior period must have some relation to the chance of that allocation-alternative residing upon an efficiency line or at least remaining a strong alternative in future periods.

This issue is compounded by the fact that an asset allocation strategy is, in practice, a process that is only relevant in solving for the issue of "long-term" investment performance and risk. Economists have found that market conditions are cyclical and change over time, and that the relative strength of various market sectors, and of the various combinations of market sectors, shifts with these changes. The population of allocation alternatives residing on an efficiency line in a past analysis-period that documents one phase of a market cycle is comprised of those allocation alternatives most responsive to the specific market conditions of that cycle phase. As market conditions changes, these alternatives are the ones within the population that are least likely to thrive in a transition of markets to another phase of a cycle.

It is therefore a principal object of this invention to provide a method of selecting and evaluating investments to generate a solution set of allocation strategies.

It is also an object of the invention to employ a database approach to selecting investments that is based on the analysis of a series of statistics of population dynamics over time.

Another principal object is to provide a method with the foregoing advantages that is strongly predictive of future differences in investment performance characteristics among populations of allocation alternatives, and is reliable regardless of market conditions, and produces a magnitude of superior future performance that justifies the cost of practicing the selection process.

SUMMARY OF INVENTION

The present invention preserves the advantages of prior art methods for selecting and evaluating investments to generate a solution set of allocation strategies. In addition, it provides new advantages not found in currently available methods and overcomes many disadvantages of such currently available methods.

The invention is generally directed to a novel method for selecting and analyzing investments. More specifically, the present method is well-suited for investments held in a portfolio that employs asset allocation as part of the investment strategy.

The present invention solves the aforementioned problems associated with the prior art. The present method arises from the insight that existing analysis methods based on population data generated from finding an efficiency-line population of alternatives provides information about the allocation options available to the investors that is largely irrelevant to their purposes. The information generated is limited to only a small subset of the alternatives available within a population of strategy, whose value is significant only if the market conditions underlying the analysis do not change.

The method for grouping asset allocation alternatives of the present invention includes the step of providing investment performance data for a plurality of securities. The data is then used to group each of the securities into one of a number of market sectors. A contiguous series of periodic returns for each of the securities is provided. A contiguous series of average periodic returns for the population of securities within each market sector is generated. An minimum allocation percentage increment is determined for each of the market sectors. Each allocation alternative is determined as the combination of a multiple of this minimum allocation percentage increment from each of the market sectors. A list of all possible allocation alternatives that can be constructed from all combinations of these multiples from all market sectors is then made. A contiguous series of weighted-average periodic returns for each of the allocation alternatives is then calculated. The average and variance of the series of weighted-average periodic returns are calculated for a series of analysis periods of varying length. The population of allocation alternative performance records used for selection and evaluation processes is the product of the population of all possible alternative allocations for all analysis periods. For example, combining five market sectors for all multiples of the minimum allocation percentage increment of five percent yields a population of 10,626 possible allocation alternatives. Calculating the investment performance characteristics of this population for analysis periods of varying lengths beginning each quarter for a forty year timeframe yields 1.7 million allocation performance records.

BRIEF DESCRIPTION OF DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 4 is a chart illustrative of the process utilizing a computer and a data storage device to construct a database whose data records include a series of weighted-average periodic returns for a population of all possible allocation alternatives available from the combination of pre-determined set of market sectors and a minimum allocation percentage increment in accordance with the present invention;

DETAILED DESCRIPTION

Figure 1:
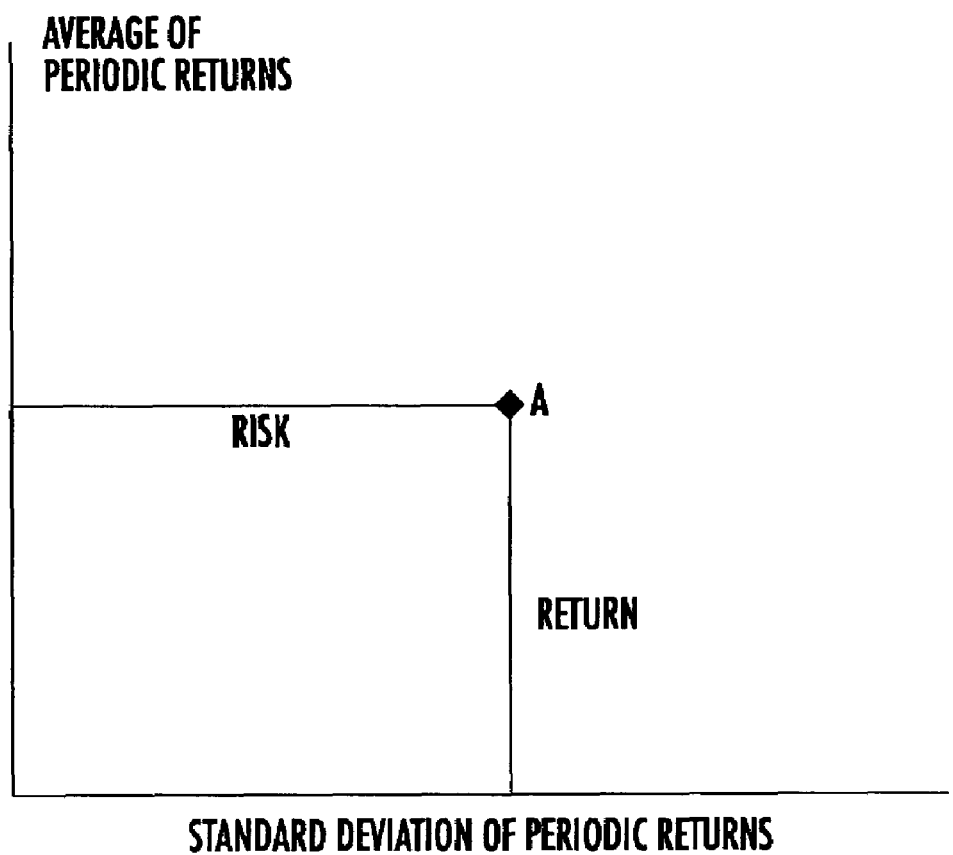
FIG. 1 is a prior art graph of investment return versus investment risk, a relationship known as investment performance. Investment returns, calculated as the average of the returns from a contiguous series of investment-periods, investment risk, as the variance of those investment-period returns around their average, and investment performance, as Point A, are illustrated as a "mean-variance' graph.
Figure 2:
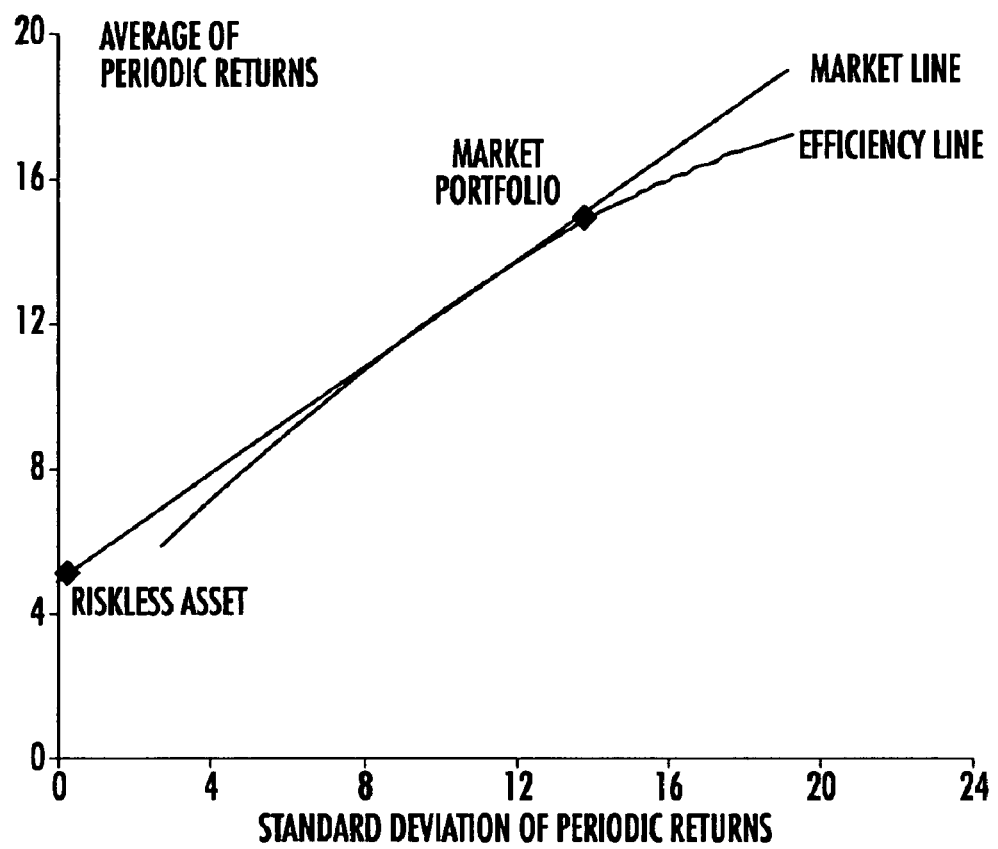
FIG. 2 is a prior art mean-variance graph describing a population of asset allocation strategy alternatives as an efficient-frontier sample of that population. The investment performance of that efficient-frontier sample is identified by an efficiency-line and its most efficient member by the point entitled "market-portfolio", the point of tangency between an efficiency line and a "market line" drawn from the point of average return for a riskless asset.
Figure 3:
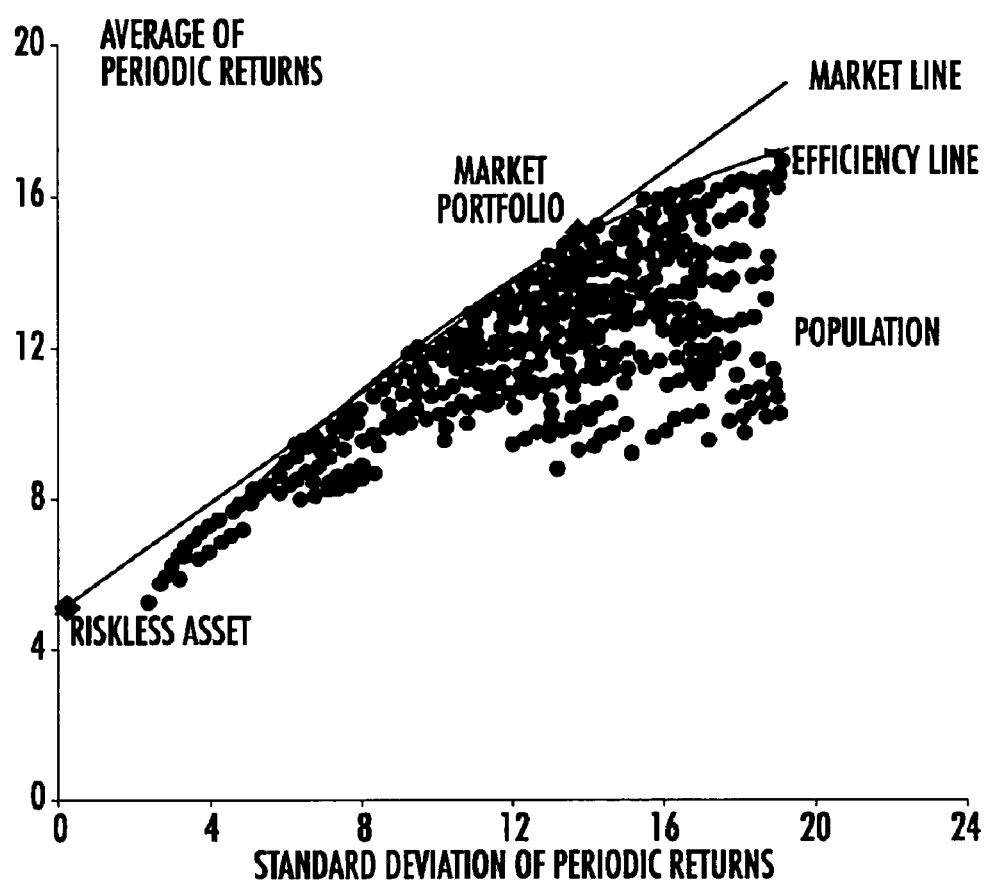
FIG. 3 is a mean-variance graph describing a population of asset allocation strategy alternatives within the context of the prior art and in accordance with the process of the present invention.

Forty years of performance data for investment portfolios from domestic and foreign securities is available for use with the present method. This amount of data is sufficient for deriving the statistics necessary to answer the types of questions raised by investors in evaluating allocation alternatives in accordance with the present invention. These questions are ones pertaining to long-term risk that can only be answered in the context of comparing the effect that risk has on whole populations of alternatives across multiple periods of different market conditions. FIG. 3 contrasts the completeness of the comparative investment performance record that is generated by the present method with the prior art processes for describing populations of allocation alternatives.

Figure 5:
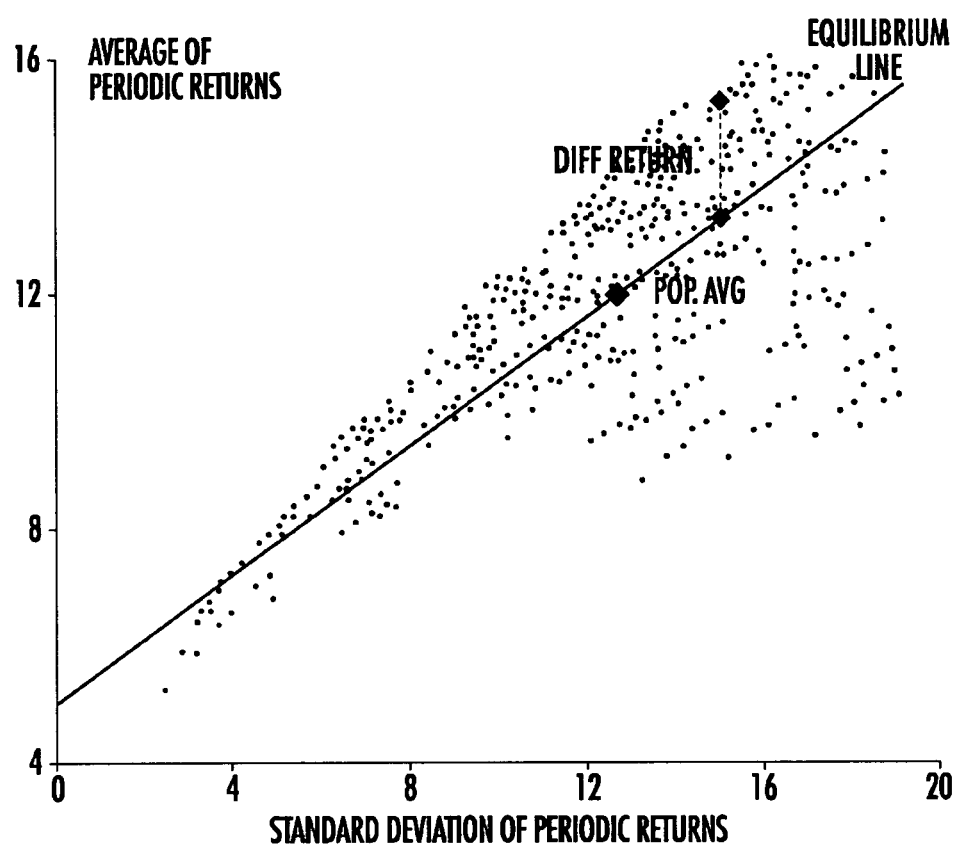
FIG. 5 is a graph illustrative of the use of a computer and a data storage device to implement the generally-accepted procedure for comparing the investment performance of investment alternatives within a population over a single analysis period, using the measurement of differential return and employing the investment performance characteristics for a population of allocation alternatives that are generated by the method of the present invention.
Figure 6:
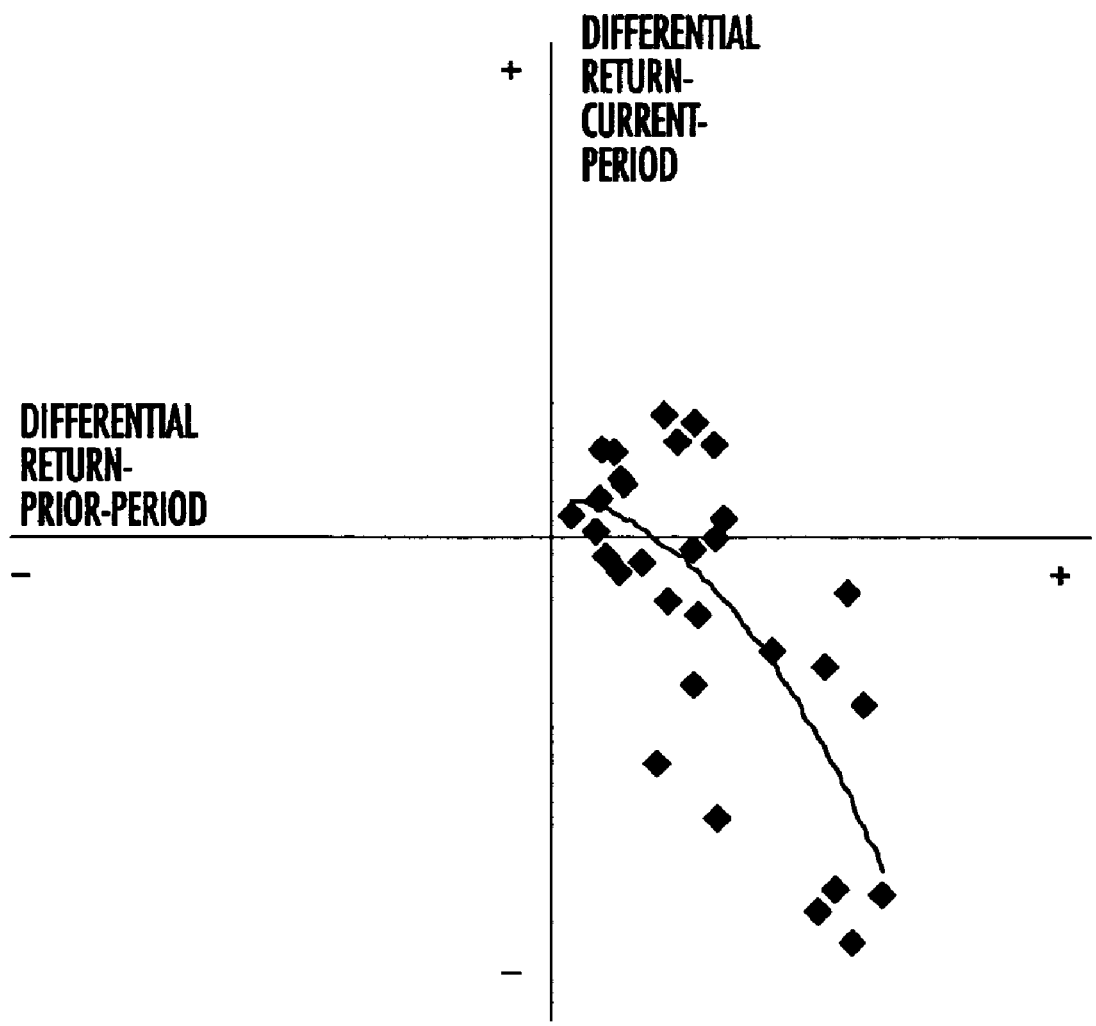
FIG. 6 is a graph illustrative of the use of a computer and a data storage device to implement the generally-accepted procedure for comparing the investment performance of investment alternatives within a population over two related analysis periods, using the measurement of differential return and employing the investment performance characteristics for a population of allocation alternatives that are generated by the method of the present invention.
Figure 7:
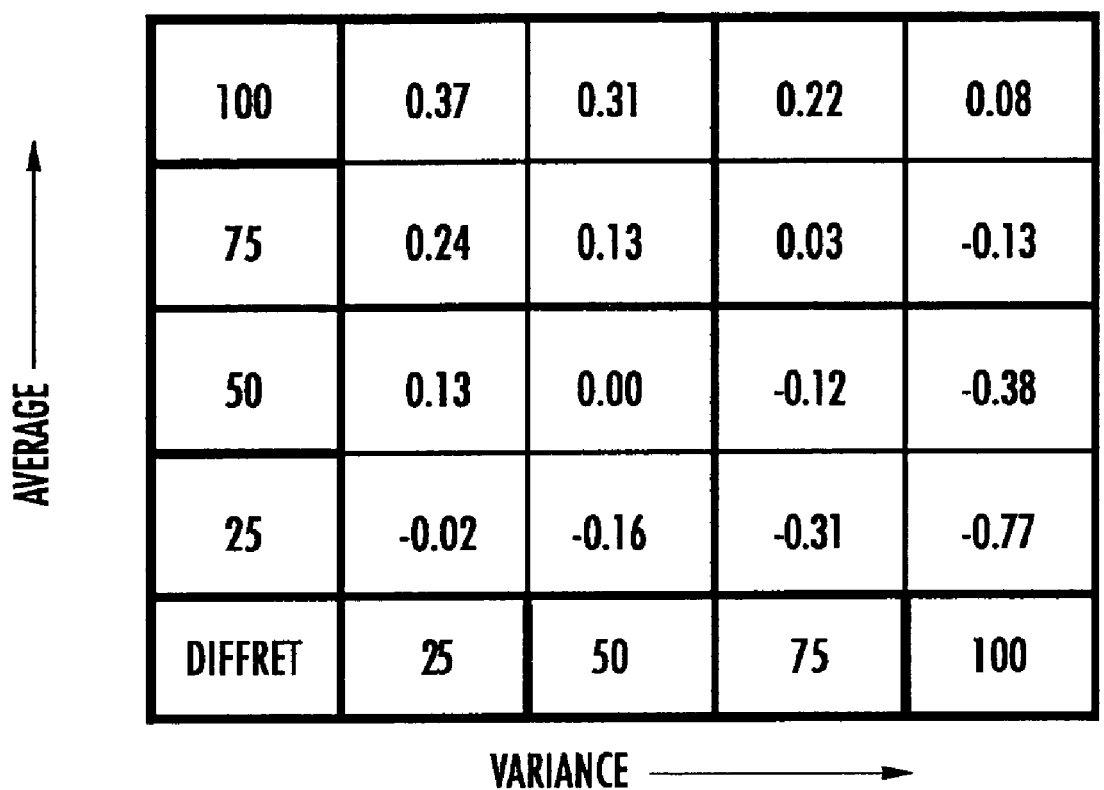
FIG. 7 is a graph illustrative of the use of a computer and a data storage device to implement the generally-accepted procedure for comparing the investment performance of investment alternatives within a population over a series of related analysis periods, using the measurements of average differential return and variance of differential returns and employing the investment performance characteristics for a population of allocation alternatives that are generated by the method of the present invention.

As shown in FIGS. 5-7, the present method uses a computer and a data storage device to evaluate the value of the recommendations of investment managers and other providers of investment advice whom have proposed or implemented a strategy for allocating the assets of an investment portfolio. An allocation strategy, unless accompanied by perfect foresight of future market conditions and the willingness of the investor to absorb the expenses associated with opportunistic changes in strategy, must, by definition, be a long-term strategy that will adequately address the risk-tolerance and investment objectives of the investor across multiple market cycles. There exists a premium on finding a strategy whose investment performance remains consistently stronger relative to its peers across all types of market conditions, the key attribute of which is market-cycle stability.

The prevailing practices of the industry, either recommending allocation strategies based on their position on an efficiency-line or on a manager"s qualitative "hunch", are ones easily colored by events in the most-recent market periods.

For example, there exist 96 allocation alternatives from among a population of 10,626 that reside along the efficiency-line for such a population after a 5-year period ending March 2001 known as an "efficient-frontier" of allocation alternatives. These are the limited set of allocation alternatives that can be identified from an allocation alternative population using existing methods for describing such populations. All 96 alternatives appear to be superior strategy choices based on the analysis of their comparative investment performance for the previous 5 years. Over a series of 36 previous-5-year-periods since 1962, however, fifty of these (96) have resided among the quartile-category of alternatives whose investment performance has been the least stable within a population of allocation alternatives and whose average performance has been the weakest among their peers over that analysis period. Another thirty-three of these 96 alternatives have experienced greater-than-average variance in their investment performance across this time-span and also have tallied an average performance for the 36 analysis periods that is below the average of their peers. These are eighty-eight out of 96 allocation-strategy choices that may bear further research before choosing as a stable alternative in which to invest over a long-term investment horizon.

In terms of evaluating "hunches", there exists a common saw that a viable strategy for the conservative investor is to invest 100% of their assets as a diversified portfolio of bonds assets of one of the five market sectors. The allocation database of the present invention employs the performance data from mutual funds, and with the recent volatility of the domestic and foreign stock markets, the alternative of a 100% bond-fund portfolio looks to be very attractive. Nevertheless, the experience of the last 40 years has been that such a strategy also resides within the quartile-category of allocation-alternatives whose market-cycle stability and long-term investment performance have been the weakest among the 10,626 alternatives. In fact, the investment performance for a portfolio 100% invested in bond funds ranks 10,608 among all 10,626 strategies in terms of investment performance stability (99.9 percentile), and dead last in terms of average investment performance over the last 40 years.

Because of the lack of success enjoyed by investment managers in applying the efficiency-line analysis to selecting for allocation strategy alternatives, much of the portfolio advice available in the market falls into this category of "hunches" or "folk wisdom".

Included within this category of hunches is that prior art that relies on pricing kernel strategies built of the folk wisdom that there actually exist providers that can predict the future. Another application of the method of the present invention is that of allocation-strategy selection. Being able to make quantitative distinctions in the performance characteristics of allocation alternatives across market cycles gives one the capability to make recommendations based on the specific needs of an investor. This use of the comparative data includes answers to questions such as "if my objective is to find an allocation strategy that has been resilient to changes in market conditions over the last 40 years, do such strategies exist?" or "if my risk tolerance is that of a bond investor, what strategies are available that have consistently performed more strongly than the bond market over the last 40 years?

As example, an investor desiring to allocate their portfolio assets so that they can be assured of consistent above-average investment performance over a five-year investment horizon, has just ten strategies available that have consistently performed better than the average of the 10,626 allocation strategies that could have been constructed from five market-sectors for successive five-year investment periods over the last 40 years. These ten strategies have, on average, delivered an investment return of approximately 200 basis points above that of the bond market, as represented by the Lehman Brothers Aggregate Bond Index, at less than 85% of that market"s investment risk.

As another example, an investor wishing assurance of consistently positive annual returns, strategies without an annual loss over the last forty years, has just three choices of strategies among the 10,626 available in a five market-sector allocation environment. These strategies have, on average, delivered an investment return of approximately 100 basis points above that of the bond market (Lehman Brothers Aggregate Bond Index) at less than 45% of that market"s investment risk over the last 40 years.

As shown in FIG. 4, the method of the present invention uses a computer and a data storage device to calculate past-period investment performance data for an entire population of allocation alternatives which, as illustrated for the case of the alternatives available from the combination of five market sectors in minimum allocation percentage increments of 5-percent, is comprised of 10,626 allocation alternatives. This whole-population approach enables the comparison of investment performance characteristics for an allocation alternative against population benchmark measures within a single analysis period, as well as the tracking of the comparative performance of allocation alternatives within populations that span a series of analysis periods. FIG. 4 also provides a chart of a representative series of periodic returns across the five market sectors where AGG is aggressive risk; AAB is above average risk; AVG is average risk; LRSK is low risk; and CON is contrarian risk to illustrate the present invention.

The value of this tracking capability increases over time. Because the database employed is inclusive of all options, the relative value of each alternative to their peers can be compared within the context of multiple periods of uniquely different market conditions. The longer the market span covered by a series of analysis-periods, the more valuable the information contained in an analysis of these period-comparisons are in establishing characteristic differences among allocation alternatives over the phases of a market cycles.

The method of the present invention has the following steps. First, performance data for a population of similar investment types is acquired. These types can be "primary securities" which are publicly-traded stocks and bonds, or "secondary securities" which are mutual funds, variable annuities and other classes of book-valued collective investment funds, or any other groups of similarly-structured investment vehicles. The population collected should ideally be inclusive of all investments available within the type. At the least, it should include all investments available within the markets of interest to the user. In lieu of data for individual investments within the population, performance data generated from indices that are built to reflect an average or weighted-average of the investment performance characteristics for all investments within a market sector, or for a representative sample of investments within those market sectors can be used. The performance data acquired are a set of calculated investment returns for a contiguous set of investment periods ('periodic returns') for each investment. Efforts should be made to acquire as large of a set of contiguous investment-periods as available—at the very least, a set large enough to cover one complete market cycle. This data can be acquired from any of a number of commercial providers.

Second, the average of a series of these periodic returns and a measurement of the variance of this series of periodic returns around this average are calculated for each investment. The variance of periodic returns is representative of investment risk for an investment over a specified "analysis-period".

Third, using the tenets of Modem Portfolio Theory, the investments are grouped into categories of investments having uniquely similar levels and patterns of investment risk. These groupings are termed "market sectors" and the populations of investments contained in each are termed, "asset classes".

For example, nvestments are grouped within the mutual funds market into (5) market-sector categories as follows:

| Market Sector Categories | |
| --- | --- |
| Market Sector | Asset Class - Fund Types |
| Aggressive Risk (AGG) | Aggressive Growth, Long-Term Growth, Sector Equity |
| Above Average Risk (AAB) | Balanced, Total Return, Growth & Income, Equity Income, Utilities |
| Average Risk (AVG) | Bond |
| Low Risk (LRSK) | Money-Market |
| Contrarian Risk (CON) | Foreign Equity, Precious Metals, Currency Hedge |

Fourth, using a computer and a data storage device, a database whose records are the set of possible all "asset allocation strategies" is constructed. An asset allocation strategy is a plan for combining investments from these market sectors into an "investment portfolio". An investment portfolio is a collection of two or more investments. The commonly-held objective of maintaining such collections is to maximize future investment returns for an expected level of investment risk. Asset allocation plans are devised in terms of the percentage of portfolio assets to be held in investments from each market sector and alternative plans are known as allocation strategy alternatives. For example, a list of alternative strategies is generated by combining the five market sectors of mutual funds in minimum allocation percentage increments of 5-percent each to form an investment portfolio. This results in a list of 10,626 allocation alternatives, as shown in FIG. 4, portion B.

Fifth, a series of average periodic returns is calculated from the periodic returns of the investments within each asset class, either as the arithmetic average or an average weighted by such factors as asset size or market value.

Sixth, the series of periodic returns generated by each allocation alternative is then calculated by multiplying each asset-class average periodic return by the percent of portfolio assets allocated to that asset class for each allocation alternative.

Seventh, the investment performance statistics ("alternative-statistics") are calculated for each allocation alternative for each analysis-period. These performance statistics include average return and periodic returns variance.

Eighth, "population-comparison statistics" are calculated for each analysis-period. These statistics include measures of relative investment performance, including differential return, and population averages and variances for investment performance measures, such as average of average returns and average variance of periodic returns.

Other characteristics of an allocation alternative population can be identified in terms of other statistical measures common to the industry for example, an efficiency-line and the maximum point of differential return on that efficiency-line can be calculated and the allocation alternatives belonging to these groups marked.

For purposes of implementing and communicating a comparative analysis of investment performance, these statistics are charted on a 'mean-variance' graph, whereby comparative investment performance is illustrated as a function of average returns (y-axis) and returns variance (x-axis).

The investment performance for all allocation alternatives for the analysis-period can be placed on this graph, along with lines marking the investment performance of the population of an efficiency-line and of the average for all alternatives for the analysis-period. Such an "analysis-period average" line can be constructed under the tenets of the CAPM whereby the average is a line drawn from a point of average return for a risk-less asset through a point of the population-average average return and returns variance. An allocation alternative's differential return is its vertical distance from such a line drawn on a mean-variance graph.

Ninth, categories comprised of allocation alternatives of similar investment performance characteristics within a analysis-period population are created and category-average measures of investment performance, such as category average return and category average returns variance are generated. Such "category-statistics" are used to generate an analysis of comparative investment performance as a "category-matrix"—the categories for average return on the vertical axis of the matrix in descending order and the categories of returns variance on the horizontal axis in ascending order. Such a matrix represents a 'stylized' view of the mean-variance graph, whereby otherwise unidentifiable differences in population characteristics can be revealed. A category-matrix is the visual representation of a Chi-squared statistical analysis.

These matrixes are useful in comparing characteristics of large groups of allocation alternatives or alternative statistics across multiple analysis-periods. For example, if an alternative is identified as being ranked within the top quartile of alternatives in one analysis-period in terms of investment returns, what are the chances that it will remain among the choices within the top quartiles for investment returns in a subsequent analysis-period? Tenth, population-comparison statistics, such as differential returns are standardized (recalculated to a standard scale in terms of deviation of the measure from a population average) and compared across a time-series of analysis-period populations ("time-series statistics").

The average and variance of analysis-period differential returns for each alternative can be calculated across the time-series of analysis-period populations and each alternative placed within a category for these statistics.

These time-series statistics can also be illustrated as a category-matrix, the categories for the average of the analysis-period differential returns placed in descending order on the vertical axis and the variance for those differential returns in ascending order on the horizontal axis. These time-series statistics are useful in answering questions regarding the long-term viability of allocation alternatives-indicating the strength and variance of relative investment performance across multiple market cycles.

It should be noted that since the number of allocation alternatives within a population in each analysis period is a function of both the number of market sectors and the level of minimum allocation percentage increments chosen, the number of allocation-alternatives within a population of all possible allocation alternatives can vary. The consideration of five market sectors, combined in increments of 5-percent each yields 10,626 alternatives; four market sectors in increments of 5-percent yields 1,771 alternatives and six market sectors in 5-percent increments, 52,423 alternatives. The consideration of minimum allocation percentage increments of 5-percent for 5 market sectors yields 10,626 alternatives; minimum allocation percentage increments of 20-percent for 5 market sectors yields 75 alternatives; and minimum allocation percentage increments of 50-percent for 5 market sectors yields 15 allocation alternatives for a population of all possible allocation alternatives.

The raw data employed for this method comes from a commercially available database of mutual fund investment performance statistics, and the market sectors evaluated are sectors made up of mutual fund investments. The market-sector periodic returns are the weighted average periodic returns for the investments within the sector where the weight applied being the asset value of each fund within the asset class. Other types of performance data exist and can be used.

For example, indices exist for all the primary sectors of the primary-securities markets (i.e. stocks and bonds). These indices are either population averages or population samples of investment performance data. The sectors and allocation strategies formulated from these indices relate to the primary-securities markets, rather than the mutual fund (i.e. book-valued investment fund) market.

The length of the analysis-period used for allocation alternative and population investment performance statistics can vary as a function of, among other factors, the time-horizon of the investor. The number of analysis-periods calculated for a time-series analysis is a function of how many can fit within the timeframe represented by the available data. For example, 40 years of performance data yields a series of 36 5-year analysis-periods of average returns and returns variance data for each of 10,626 allocation-alternatives; a series of 31 10-year time periods of average return and returns variance data or; a series of 40 1-year analysis-periods of average return and returns variance data.

The aforementioned finding that there existed only (3) allocation alternatives that produced a positive average annual return for each of the last forty years is an example of an analysis performed from an "alternative-statistic"—an analysis of a time-series 40 analysis-periods of 1-year average return and returns variance data for an individual allocation alternative within a population. The set of three alternatives are those whose annual returns where greater than zero for each of the 40 analysis-periods. The allocation alternative population illustrated in FIG. 3 indicates how a population of alternative-statistics for investment performance would be communicated through a mean-variance graph.

Additionally, "population-comparison statistics" are generated, for example, the strength of an alternative"s investment performance relative to its population of alternatives can be calculated for each analysis-period as its "differential return". On the mean-variance graph of FIG. 5, this differential return is shown to be the measurement of the vertical distance between an allocation-alternative"s return and a line drawn between the population-average return and the return of a risk-free asset.

The basis for this calculation is the Capital Assets Pricing Model (CAPM), a device for estimating the population-average return across the range of investment risk within a population of securities. CAPM was developed by Dr. William Sharpe in 1964 and is the tool generally used throughout the industry for comparing the relative performance among a population of investment alternatives. For a population of allocation alternatives, those residing on an efficiency line are ones possessing the highest "differential return" at each level of investment risk available within a population of allocation alternatives.

The aforementioned finding of ten allocation alternatives that have consistently performed better than the average of their peers over a 5-year analysis-period since 1962 came from the analysis of this type of "population-comparison statistic" for a time-series of 36 5-year analysis-periods in the 40-year span. Those ten alternatives are those whose differential returns where greater than zero for each of the 36 analysis-periods.

Average return, return variance, differential return and other population-comparison statistics can also be compared between two analysis-periods which is a "time-series statistic", as shown in FIG. 6. In this chart, the average differential returns a category of allocation alternatives in a prior analysis period is plotted on one axis, the average differential returns for the category of allocation alternatives for a subsequent analysis period is plotted on the opposing axis. The placement of the combined data points in one of the 4 quadrants formed by the axes indicates whether the relative value of that category"s investment performance relative to the population of allocation alternatives has changed for a subsequent period. The findings cited earlier in this text regarding the strength of investment performance in subsequent evaluation periods for alternatives selected for their maximum level of differential returns in those selection periods is an example of such a "time-series statistic".

Furthermore, both the population-comparison and time-series statistics can be grouped into category populations of allocation alternatives possessing similar levels of returns, risk, differential returns, differential-returns variance or other such types of alternative and population-comparison performance statistics, and plotted as a "category-statistic". For example, an average and variance around this average can be calculated for the series of 36 5-year differential returns for each allocation alternative. The average indicates the overall strength of the investment performance for each alternative across the 40-year span. The variance indicates how stable this performance was over multiple market cycles.

Turning now to FIG. 7, the category-statistics can be structured as a "category-matrix". The variance in the analysis-period differential returns for each alternative is marked as belonging to one of four categories of equal population size on the horizontal axis. The category rankings run from 25 to 100 indicating the most stable to the least stable cycle-to-cycle performance. The average of the analysis-period differential returns for each alternative is marked as belonging to one of four categories of equal population size on the vertical axis of the matrix. These category rankings also run from 25 to 100, indicating the lowest to the highest average differential return. The population average for differential return average and variance resides along the line dividing the 50 and 75 category for both the horizontal and vertical axis.

The statement above, regarding fifty of the most-recent-period efficiency-line residents being worthy of further review, is based on the fact that these fifty alternatives all reside in the category occupying the lowest right-hand corner of a category-matrix for 5-year differential returns since 1962. This lowest, right-hand corner is the position of those allocation alternatives exhibiting the greatest variance in differential returns between 5-year analysis-periods (variance category 100) and the lowest average differential return over the last forty years (average category 25).

Such a category-statistic is also the basis for the aforementioned analysis of the reasonableness of the allocation alternatives resident of the March 2001 5-year efficiency line and of the 100% bond portfolio. This position as the lowest right-hand corner of a category-matrix is the home of a portfolio allocation strategy for 100% bond funds.

These and other modifications and variations occurring to those skilled in the art are intended to fall within the scope of the appended claims.

The invention claimed is:

1. A method, using a computer with data storage device thereon, to construct a computer database for a population of asset allocation alternatives for the purpose of generating comparative statistics of investment performance for a whole-population of available asset allocation alternatives over a plurality of analysis periods, comprising the steps of:
   providing investment performance data for a plurality of securities, made from publicly offered securities, in a computer database on the computer;

grouping the securities, using the computer, on the basis of this performance data into one of a plurality of market sectors inclusive of all markets available to an investor; the securities within each market sector having uniquely similar levels and patterns of investment risk;

determining, using the computer a series of periodic investment returns of each of the securities;

acquiring and storing within the computer a series of the average of periodic investment returns for the population of securities within each of the plurality of market sectors for a plurality of analysis periods;

determining, using the computer, a minimum allocation percentage increment for each of the market sectors;

determining, using the computer, allocation alternatives from the application of multiples of this minimum allocation percentage increment for each of the market sectors;

creating, using the computer, a population of the all possible allocation alternatives that can be determined from the application of all multiples of this minimum allocation percentage increment for all determined market sectors; wherein the population is comprised of at least 500 allocation strategies when calculated as the product of the number of market sector populations times the number of minimum allocation percentage increments times the number of analysis periods;

calculating, using the computer, a series of weighted-average periodic returns for each of the allocation alternatives within that population;

determining a plurality of allocation alternatives which reside along an efficiency-line population of allocation alternatives; and calculating, using the computer, analysis-period measures of investment performance for the population of all possible allocation alternatives and the series of weighted-average periodic returns;

generating comparative statistics of investment performance for whole populations of asset allocation alternatives across multiple time periods to determine which asset allocation alternative has desirable characteristics of investment return and risk; and selecting the asset allocation alternative with a desirable characteristic of investment return and risk for investment by an investor.

2. The method of claim 1, wherein the number of market sectors is five.

3. The method of claim 1, wherein the plurality of securities includes the type known as book-valued collective investment funds.

4. The method of claim 1, wherein the series of analysis-period investment performance measures are a series of five-year analysis periods initiated each quarter over the past forty years.

5. The method of claim 1, wherein the market sector allocations are determined in minimum allocation percentage increments of 5 percent.

6. The method of claim 1, wherein a total of 10,626 allocation alternatives are provided as the population of all possible allocation alternatives for each analysis period.

7. A method, using a computer with a computer database on data storage device thereon, of generating comparative statistics of investment performance for whole populations of asset allocation strategies, comprising the steps of:

acquiring performance data for a population of similar investments inclusive of all securities markets available to an investor; storing the performance data in the data storage device; said performance data being from publicly offered securities;

calculating, using the computer, an average of these periodic returns and a measurement of a variance of the periodic returns around the average returns for each investment for a plurality of analysis periods;

grouping, using the computer, the investments into categories of investments having uniquely similar levels and patterns of investment risk, known as asset classes;

calculating, using the computer, an average of the periodic returns for the population of securities within each asset class;

constructing, using the computer, a set of all possible asset allocation strategies, inclusive of an entire range of allocation strategies that can be derived from a population of securities, from the combination of all multiples of the minimum allocation percentage increment from each asset class; wherein the population is comprised of at least 500 allocation strategies when calculated as the product of the number of market sector populations times the number of minimum allocation percentage increments times the number of analysis periods;

calculating, using the computer, a series of periodic returns generated by each allocation alternative by multiplying the asset-class average periodic return by the percent of portfolio assets allocated to that asset class for each allocation alternative;

calculating, using the computer, the performance statistics for each allocation alternative for each analysis-period;

determining a plurality of allocation alternatives which reside along an efficiency-line population of allocation alternatives;

calculating, using the computer, population-comparison statistics for each analysis-period;

generating, using the computer, categories of allocation alternatives within each analysis-period population based on similar population-comparison statistics; and normalizing, using the computer, population-comparison statistics by recalculating the statistics to a standard scale in terms of deviation of the measure from a population average and comparing the statistics across a time-series of analysis-period populations;

generating comparative statistics of investment performance for whole populations of asset allocation strategies across multiple time periods to determine which asset allocation strategy has desirable characteristics of investment return and risk; and selecting the asset allocation strategy with a desirable characteristic of investment return and risk for investment by an investor.

8. The method of claim 7, wherein the performance data is mutual funds, variable annuities and other book-valued collective investment funds.

9. The method of claim 7, wherein the performance data acquired is a set of calculated investment returns for a contiguous set of time periods for each investment.

10. The method of claim 7, wherein the calculation of the average of the periodic returns for each asset class is by arithmetic average.

11. The method of claim 7, wherein the calculation of the average of the periodic returns for each asset class by average weighted asset size.

12. The method of claim 7, wherein the calculation of the average of the periodic returns for each asset class by average weighted market value.

13. The method of claim 7, wherein the population-comparison statistics include average return and periodic returns variance.

14. The method of claim 7, wherein the population-comparison statistics include differential return and the average and variance of average returns and returns variance for the population of categories of that population.

* * * * *